United States Patent [19]
Onuma et al.

[11] Patent Number: 6,058,766
[45] Date of Patent: May 9, 2000

[54] CRANK ANGLE DETECTOR

[75] Inventors: Koki Onuma; Masato Ono, both of Shioya-gun; Shigeaki Kuwabara; Kazuhiro Sato, both of Wako, all of Japan

[73] Assignees: Keihin Corporation; Honda Giken Kogyo Kabushiki Kaisha, both of Tokyo, Japan

[21] Appl. No.: 09/144,645

[22] Filed: Aug. 31, 1998

[30] Foreign Application Priority Data

Oct. 27, 1997 [JP] Japan ................................. 9-293996

[51] Int. Cl.$^7$ .................................................. G01M 15/00
[52] U.S. Cl. ............................................. 73/117.3; 73/116
[58] Field of Search .................................. 73/116, 117.2, 73/117.3; 701/110, 101

[56] References Cited

U.S. PATENT DOCUMENTS

| | | | |
|---|---|---|---|
| 5,433,108 | 7/1995 | Sawada | 73/117.3 |
| 5,819,197 | 10/1998 | Fiaschetti et al. | 73/117.3 |
| 5,945,828 | 8/1999 | Katogi et al. | 73/117.3 |
| 5,991,684 | 11/1999 | Fukuchi et al. | 73/117.3 |

*Primary Examiner*—Eric S. McCall
*Attorney, Agent, or Firm*—Arent Fox Kintner Plotkin & Kahn, PLLC

[57] ABSTRACT

A crank angle detector in which a rotary body rotates in association with a crankshaft of an engine and has portions to be detected every predetermined angle and at least one of the portions to be detected is lacking, and first and second pickups positioned near the outer periphery of the rotary body with a fixed angle difference therebetween, for generating first and second pulses each time the portion to be detected passes. When a number of second pulses equal to or more than a predetermined number are detected after the first pulse has been detected, the crank angle detector sets the time the first pulse is newly detected, as a reference position time for a rotating angle of the crankshaft.

3 Claims, 9 Drawing Sheets

CRANK ANGLE DETECTOR

BACKGROUND OF THE INVENTION

1. Field of the Invention

The present invention relates to a crank angle detector for detecting an angle of a crankshaft of an engine.

2. Description of the Related Background Art

For controlling a fuel injection timing for supplying fuel to an engine by an injector or for controlling an ignition timing for discharging spark to an ignition plug, a rotating angular position from a reference position of a crankshaft of an engine, i.e., a crank angle is detected to set these timings based on the detected crank angle (see, for example, Laid-open Japanese Patent Application No. 63-263269 and Japanese Patent Publication No. 5-11562).

A conventional crank angle detector for detecting an angle of a crankshaft of an engine uses a disk-shaped rotary body adapted to rotate in association with rotation of the crankshaft, and an electromagnetic pickup positioned near the outer periphery of the rotary body. A plurality of convex portions made of a magnetic material are continuously arranged as portions to be detected on or near the outer periphery of the rotary body at predetermined angular intervals, where at least one convex portion is lacking in the regular arrangement. As the rotary body rotates in association with the crankshaft, the electromagnetic pickup generates a pulse each time a convex portion passes near the electromagnetic pickup. Since the lack of the convex portion results in a relatively long period in which no pulse is generated, the time at which a next pulse is generated is defined as a reference position time for a rotating angle of the crankshaft. A stroke of each cylinder is identified on the basis of the reference position.

In the conventional crank angle detector as mentioned above, however, the crankshaft does not rotate at a uniform speed during one rotation. Specifically, the rotating speed slightly varies depending on strokes such as a compression stroke, an explosion stroke, causing a pulse interval to correspondingly vary. Also, in addition to variations in the pulse interval during accelerating and decelerating operations, the pulse interval likewise varies particularly due to mechanical frictions in an engine when the engine is at low temperature. Thus, such variations, if appearing largely, makes unclear a time difference between a longer pulse interval due to the lacked convex portion and a normal pulse interval, leading to a failure in accurately identifying the reference position time of the rotating angle of the crankshaft.

SUMMARY OF THE INVENTION

It is therefore an object of the present invention to provide a crank angle detector which is capable of accurately identifying a reference position time for a rotating angle of a crankshaft.

A crank angle detector according to a first aspect of the present invention is characterized by comprising a rotary body which rotates in association with a crankshaft of an engine and has portions to be detected every predetermined angle and in which at least one of the portions to be detected is lacking; first and second pickups positioned near the outer periphery of the rotary body with a fixed angle difference therebetween, for generating first and second pulses for each time the portion to be detected passes nearby; first pulse detecting means for detecting the first pulse output from the first pickup; second pulse detecting means for detecting the second pulse output from the second pickup; and reference position setting means for setting a reference position time for a rotating angle of the crankshaft, wherein when a number of second pulses equal to or more than a predetermined number are detected by the second pulse detecting means after the first pulse has been detected by the first pulse detecting means, the reference position setting means sets the time the first pulse is newly detected by the first pulse detecting means, as a reference position time for a rotating angle of the crankshaft.

Also, a crank angle detector according to a second aspect of the present invention is characterized by comprising a rotary body which rotates in association with a crankshaft of an engine and has portions to be detected every predetermined angle and in which at least one of the portions to be detected is lacking; first and second pickups positioned near the outer periphery of the rotary body with a fixed angle difference therebetween, for generating first and second pulses for each time the portion to be detected passes nearby; first pulse detecting means for detecting the first pulse output from the first pickup; second pulse detecting means for detecting the second pulse output from the second pickup; and reference position setting means for setting a reference position time for a rotating angle of the crankshaft, wherein after the second pulses are successively detected by the second pulse detecting means without detecting the first pulse by the first pulse detecting means, when the magnitude of a difference between the time the first pulse is newly detected by the first pulse detecting means and the time the last one of the successively detected second pulses is detected by the second pulse detecting means is larger than a predetermined value, the reference position setting means sets the newly detected time of the first pulse, as a reference position time for a rotating angle of the crankshaft.

Further, a crank angle detector according to a third aspect of the present invention is characterized by comprising a rotary body which rotates in association with a crankshaft of an engine and has portions to be detected every predetermined angle and in which at least one of the portions to be detected is lacking; first and second pickups positioned near the outer periphery of the rotary body with a fixed angle difference therebetween, for generating first and second pulses for each time the portion to be detected passes nearby; first pulse detecting means for detecting the first pulse output from the first pickup; second pulse detecting means for detecting the second pulse output from the second pickup; first reference position setting means for setting a reference position time for a rotating angle of the crankshaft, wherein when a number of second pulses equal to or more than a predetermined number are detected by the second pulse detecting means after the first pulse has been detected by the first pulse detecting means, the first reference position setting means sets the time the first pulse is newly detected by the first pulse detecting means, as a reference position time for a rotating angle of the crankshaft; and second reference position setting means for setting a reference position time for a rotating angle of the crankshaft, wherein after the second pulses are successively detected by the second pulse detecting means without detecting the first pulse by the first pulse detecting means, when the magnitude of a difference between the time the first pulse is newly detected by the first pulse detecting means and the time the last one of the successively detected second pulses is detected by the second pulse detecting means is larger than a predetermined value, the second reference position setting means sets the newly detected time of the first pulse, as a reference position time for a rotating angle of the crankshaft.

DETAILED DESCRIPTION OF THE PREFERRED EMBODIMENT

One embodiment of the present invention will hereinafter be described in detail with reference to the accompanying drawings.

Figure 1:
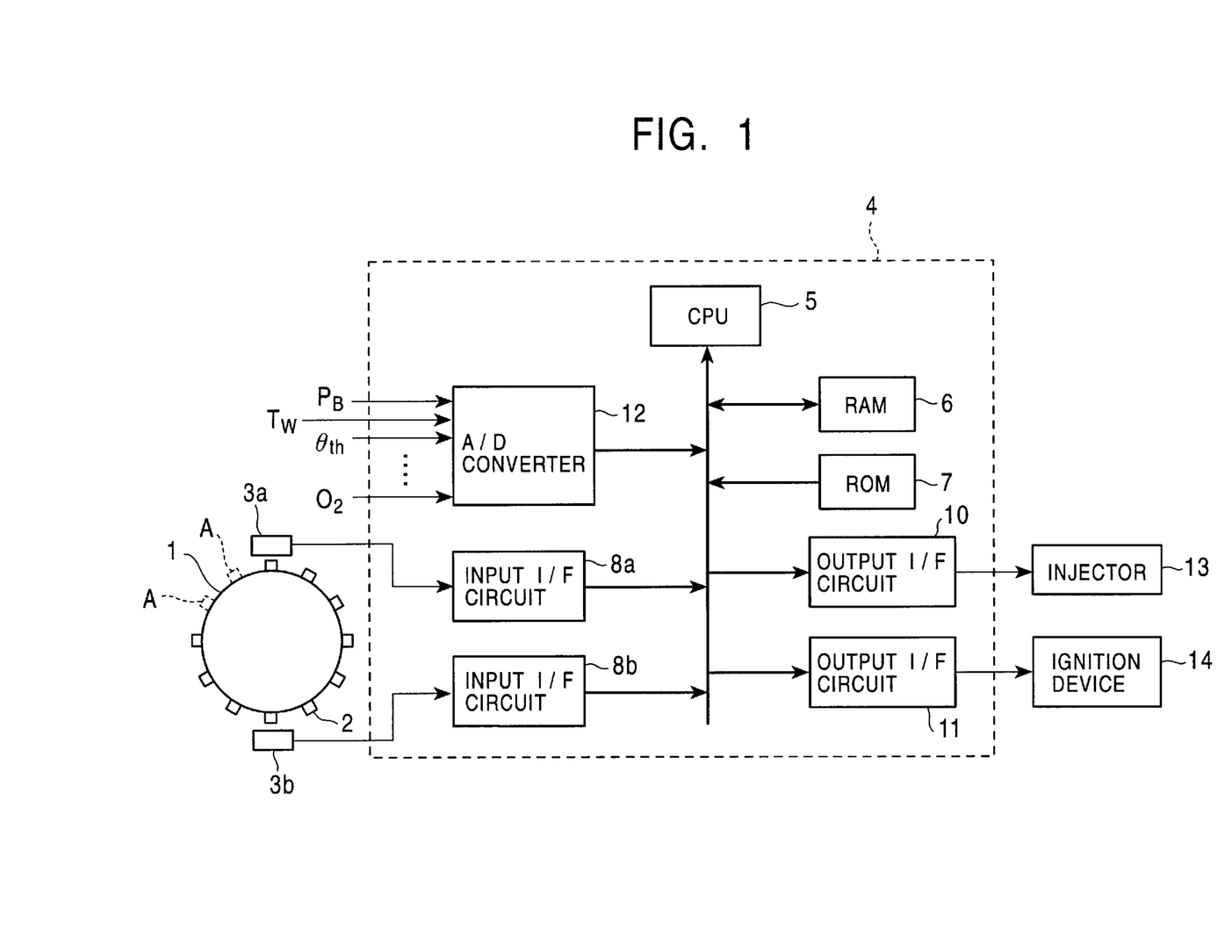
FIG. 1 is a block diagram illustrating a crank angle detector according to an embodiment of the present invention.

FIG. 1 illustrates a crank angle detector according to the present invention. This crank angle detector has a disk-shaped rotary body 1 mounted to a crankshaft (not shown) of a four-cycle engine having four cylinders. The rotary body 1 is adapted to rotate in association with rotation of the crankshaft. Only ten convex portions 2 made of a magnetic material are continuously arranged as portions to be detected at intervals of 30° on the outer periphery of the rotary body 1, while two convex portions are lacking as indicated by broken lines A. Two electromagnetic pickups 3a, 3b are arranged near the outer periphery of the rotary body 1. The electromagnetic pickups 3a, 3b are positioned with a crank angle difference of 180 spaced therebetween. As the rotary body 1 rotates, each of the electromagnetic pickups 3a, 3b generates a pulse of negative polarity when a convex portion 2 passes nearby.

Outputs of the electromagnetic pickups 3a, 3b are connected to an ECU (Electric Control Unit) 4. The ECU 4 comprises a CPU 5, a RAM 6, a ROM 7, input interface (I/F) circuits 8a, 8b, output interface circuits 10, 11, and an A/D converter 12. The input interface circuit 8a waveform-shapes pulses output from the electromagnetic pickup 3a, and outputs the waveform-shaped pulses to the CPU 5, while the input interface circuit 8b waveform-shapes pulses output from the electromagnetic pickup 3b, and outputs the waveform-shaped pulses to the CPU 5. The CPU 5 has counters, in the form of software programs, for counting the waveform-shaped pulses output from the respective input interface circuits 8a, 8b. Also, the CPU 5 performs an operation, later described, to detect a crank angle. The CPU 5, the RAM 6, the ROM 7, the input interface circuits 8a, 8b, the output interface circuits 10, 11, and the A/D converter 12 are commonly connected together to a bus.

The output interface circuit 10 drives an injector 13 in response to an injector driving command from the CPU 5. The injector 13 is arranged near an intake port of an intake pipe in an internal combustion engine for injecting a fuel when it is driven. The output interface circuit 11 activates an ignition device 14 in response to an ignition control signal from the CPU 5.

The A/D converter 12 is provided for converting analog signals from a plurality of sensors to digital signals. Such sensors detect engine operating parameters required for controlling the engine, including pressure $P_B$ in the intake pipe, cooling water temperature TW, a throttle opening angle θth, oxygen concentration $0_2$ in exhaust gas, and so on.

In the crank angle detector configured as described above, the rotary body 1 rotates in association with rotation of the crankshaft of the engine, causing the respective convex portions 2 to pass near the electromagnetic pickups 3a, 3b to generate first and second pulses NE1, NE2 from the electromagnetic pickups 3a, 3b, respectively. The first and second pulses NE1, NE2, which have a phase difference of 180 degrees, are waveform-shaped by the input interface circuits 8a, 8b, and then supplied to the CPU 5.

Figure 2:
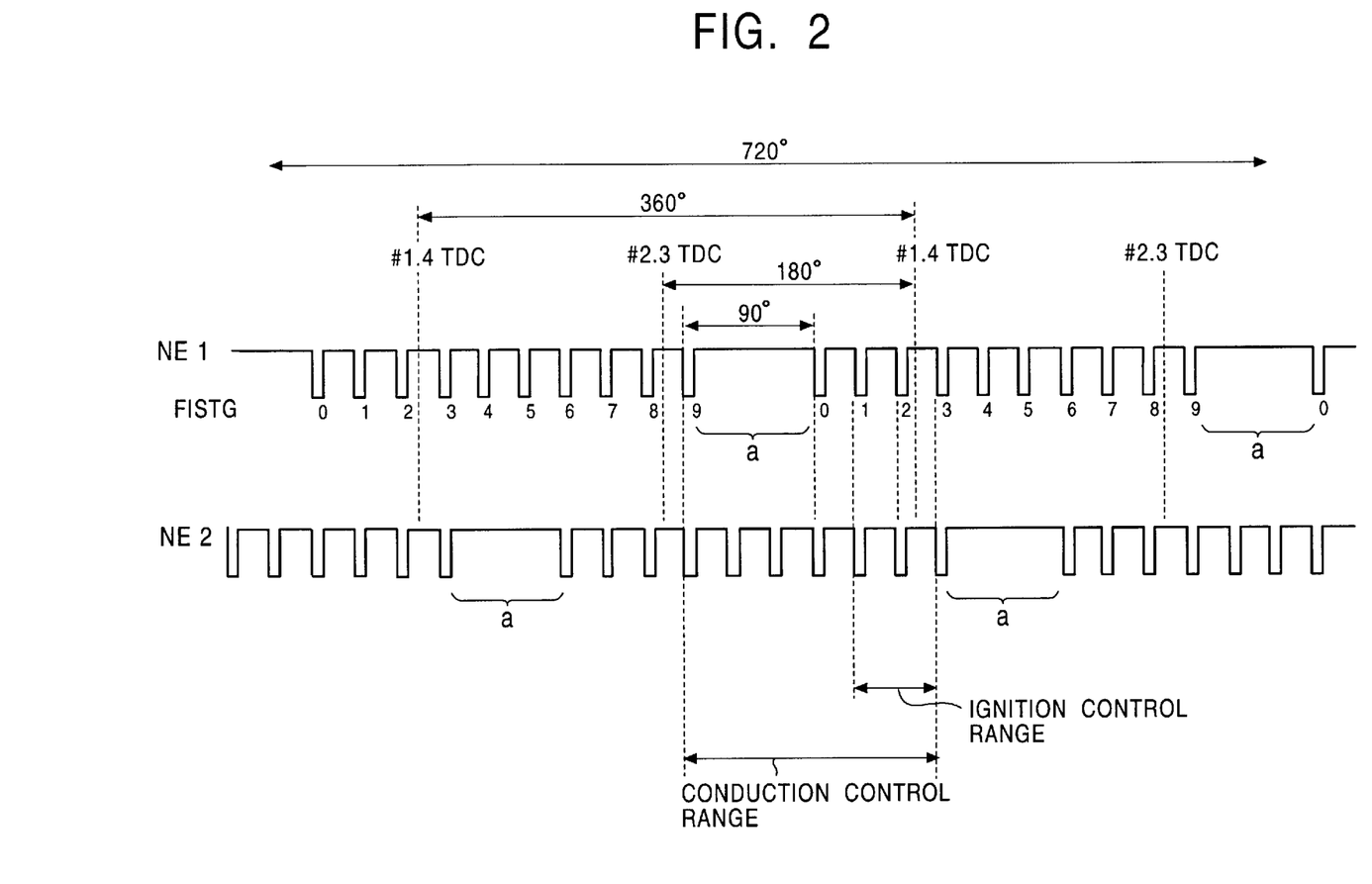
FIG. 2 illustrates waveform charts for waveform shaped first and second pulses.

FIG. 2 illustrates the waveform-shaped first and second pulses NE1, NE2 of negative polarity. Since the rotary body 1 lacks two convex portions 2 on its outer periphery, cylinder discrimination is performed relying on the time at which a first pulse NE1 is generated soon after the lacking portion (indicted by a period a in FIG. 2) as a reference position time for the rotating angle of the crankshaft. A count value FISTG in the CPU 5 is reset to #0 by the first pulse NE1 generated soon after the lacking portion. The count value FISTG is incremented by one each time the rotary body 1 rotates by an angular distance of 30 degrees in an NE1 interrupt operation, later described, and counts from #0 to #9 to represent a period of 360 degrees over which the rotary body 1 rotates once. "#" represents the position of a pulse from the first one in every 360, i.e., refers to a pulse number, where #0 corresponds a reference position of the crankshaft. Also, a pulse interval ME from the time the count value is changed to the time the count value is next changed, i.e., from the time of generation of a pulse to the time of generation of the next pulse, is output by counting clock pulses. In FIG. 2, "#1, 4 TDC" indicates that pistons of first and fourth cylinders are positioned at a top dead center, while "#2, 3 TDC" indicates that pistons of second and third cylinders are positioned at the top dead center.

It is not possible to identify which of the first and second pulses NE1, NE2 is supplied first to the CPU 5 due to various factors such as errors in mounting the electromagnetic pickups 3a, 3b, a delay in timing in the ECU 4, even when the first and second pulses NE1, NE2 are generated at the same angle of the crankshaft, except that they are not generated because of the lack of the convex portion of the rotary body 1.

Figure 3:
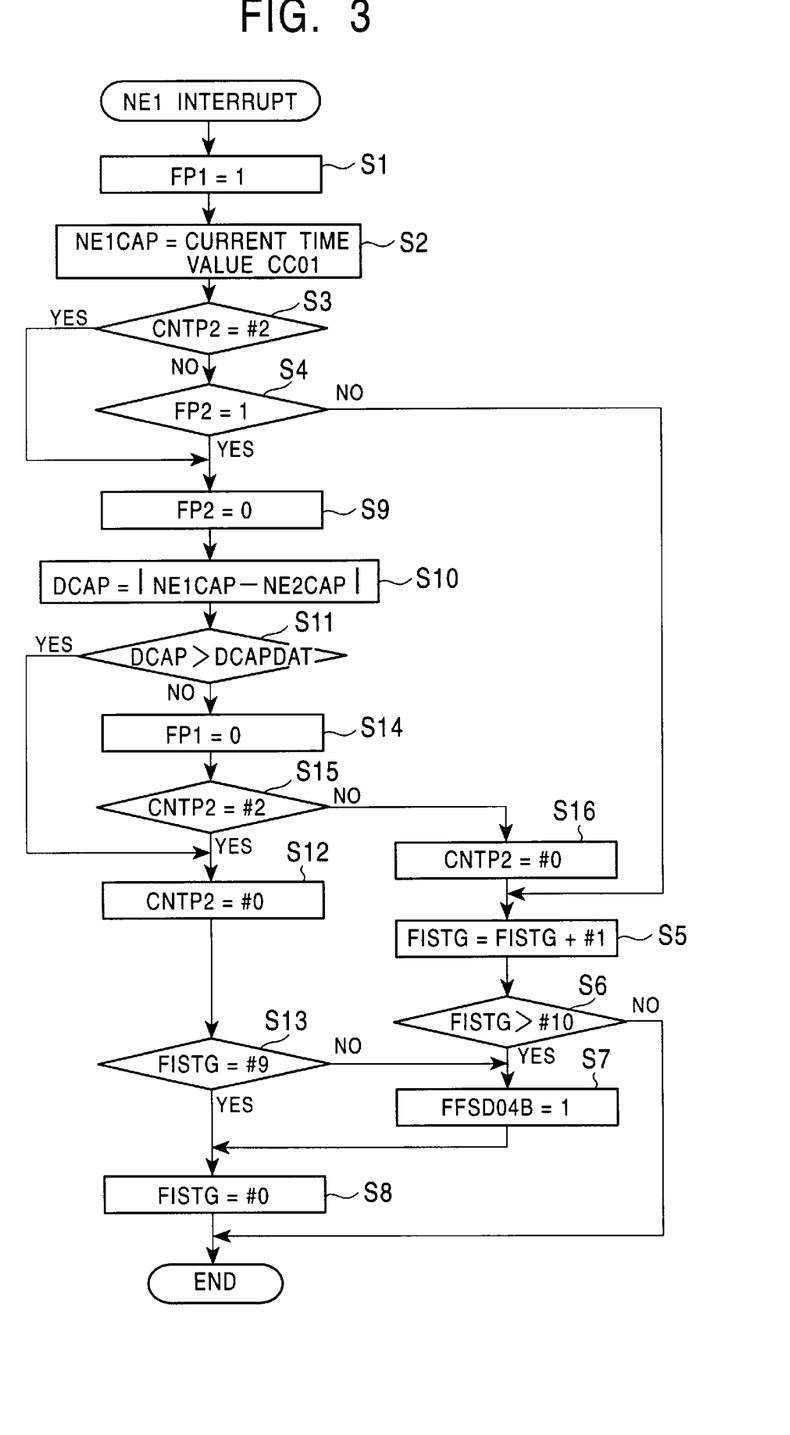
FIG. 3 is a flow chart illustrating an NE1 interrupt operation.

The CPU 5 starts an NE1 interrupt operation in response to the trailing edge of a first pulse NE1. In the NE1 interrupt operation, as illustrated in FIG. 3, a first pulse flag FP1 is set equal to one to indicate that the trailing edge of a first pulse NE1 has been detected (step S1), and a time value CC01 at that time is stored in a capture value NE1CAP (step S2). Then, it is determined whether a second pulse clock value CNTP2 is #2 or not(step SP3). If CNTP2≠#2, it is determined whether a second pulse flag FP2 is equal to one or not (step S4). FP2=1 indicates that the trailing edge of a second pulse NE2 has been detected. The flag FP2 is set by an NE2 interrupt operation, later described. If FP2=0, the flag FP2 has not been set in the NE2 interrupt operation, so that one is added to the count value FISTG (step S5), and it is determined whether the count value FISTG is larger than #10 or not (step S6). If FISTG≦#10, the NE1 interrupt operation is terminated. If FISTG>#10, such condition is normally not obtained, so that a noise sensing flag FFSD04B is set equal to one (step S7), and the count value FISTG is set to #0 which corresponds to the reference position time of the crankshaft (step S8).

If it is determined at step S3 that CNTP2=#2, this means that the second pulse NE2 has been generated three times from the extinction of one first pulse NE1 to the generation of the next first pulse NE1. In this case, the second pulse flag FP2 is reset to zero (step S9).

If it is determined at step S4 that FP2=1, this means that another first pulse NE1 has been generated after the second pulse NE2 had been generated at least once after the extinction of one first pulse NE1. Therefore, the processing also proceeds to step S9 where the second pulse flag FP2 is reset to zero.

After the execution of step S9, an absolute value of a difference between the capture values NE1CAP and NE2CAP is calculated as an input time difference DCAP (step S10), and it is determined whether the input time difference DCAP is larger than a predetermined value DCAPDAT or not (step S11). If DCAP>DCAPDAT, no second pulse NE2 is generated since the electromagnetic pickup 3b faces the convex lacking portion of the rotary body 1, and in the meantime, a first pulse NE1 is detected. In this case, the second pulse count value CNTP2 is set equal to #0 (step S12). Subsequently, it is determined whether the count value FISTG is equal to #9 or not (step S13). If FISTG=#9, the processing proceeds to step S8 where FISTG is set equal to #0. If FISTG≠#9, the processing proceeds to step S7 where the noise sense flag FFSD04B is set equal to one, followed by the processing proceeding to step S8.

If DCAP≦DCAPDAT is determined at step S11, this means that a first pulse NE1 and a second pulse NE2 have been alternately detected in sequence, so that the first pulse flag FP1 is reset to zero (step S14). Then, it is determined whether the count value CNTP2 is equal to #2 or not (step S15). If CNTP2=#2, this means that a first pulse NE1 is generated after the convex lacking portion of the rotary body 1 has passed, so that the processing proceeds to step S12 where the count value CNTP2 is set equal to #0. Further, as a result, FISTG is set equal to #0 for the reference position time at step S8, as mentioned above. If CNTP2≠#2, this means that a first pulse NE1 and a second pulse NE2 have been alternately detected in sequence without corresponding to the convex lacking portion of the rotary body 1, so that the count value CNTP2 is set to #0 (step S16), and the processing proceeds to step S5 to execute the steps subsequent thereto.

Figure 4:
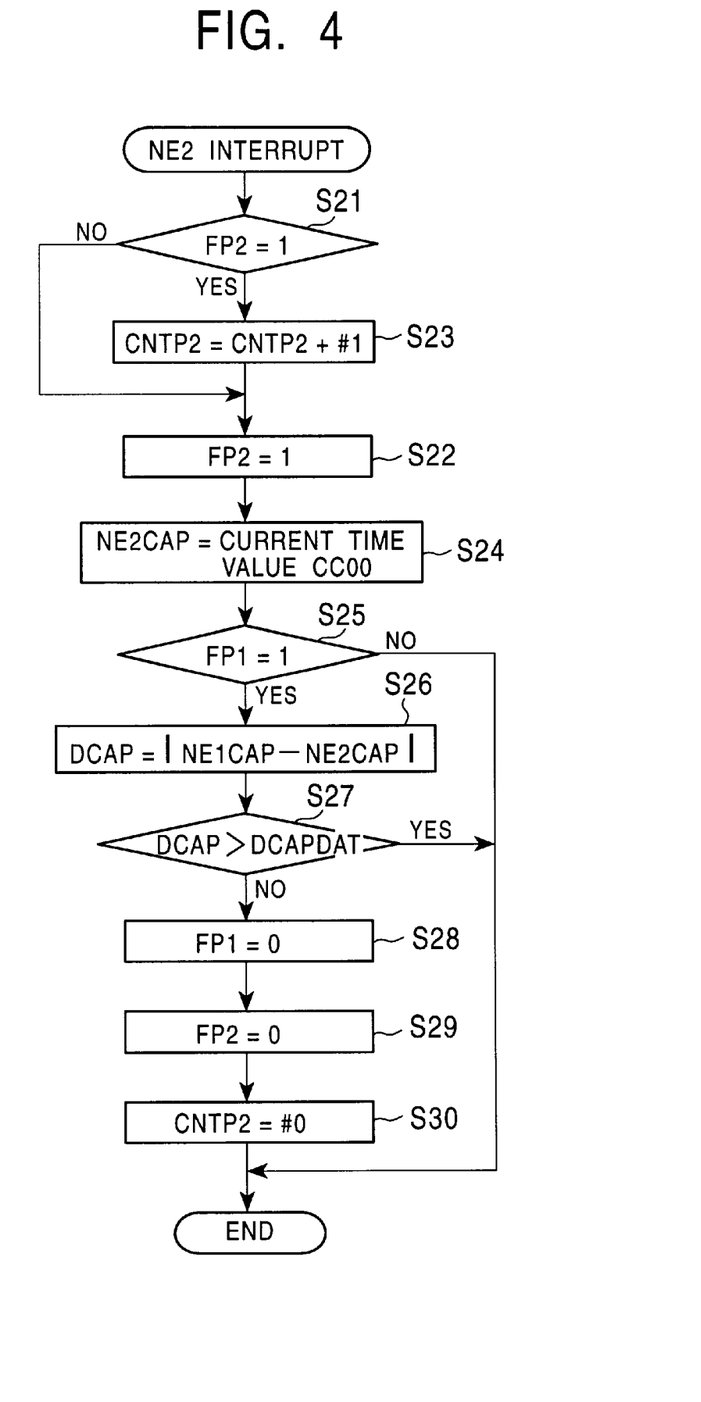
FIG. 4 is a flow chart illustrating an NE2 interrupt operation.

The CPU 5 starts an NE2 interrupt operation in response to the trailing edge of a second pulse NE2. In the NE2 interrupt operation, as illustrated in FIG. 4, it is first determined whether the second pulse flag FP2 is equal to one or not (step S21). FP2=0 means that a first pulse NE1 has generated after the generation of a second pulse NE2, and another second pulse NE2 is generated. In this event, the second pulse flag FP2 is set to one (step S22). FP2=1 means that another second pulse NE2 has been generated after the previous second pulse NE2 was generated without generating a first pulse NE1. In this event, #1 is added to the second pulse count value CNTP2 (step S23), followed by the processing proceeding to step S22.

After the execution of step S22, a time value CC00 at that time is stored in a capture value NE2CAP (step S24). Then, it is determined whether or not the first pulse flag FP1 is equal to one (step S25). If FP1=0, this NE2 interrupt operation is terminated. If FP=1, this means that a second pulse NE2 has been generated after the generation of a first pulse NE1. Thus, an absolute value of a difference between the capture values NE1CAP and NE2CAP is calculated as an input time difference DCAP (step S26), and it is determined whether the input time difference DCAP is larger than the predetermined value DCAPDAT or not (step S27). If DCAP>DCAPDAT, no first pulse NE1 is generated since the electromagnetic pickup 3a faces the convex lacking portion of the rotary body 1, and in the meantime, a second pulse NE2 is detected. Therefore, this NE2 interrupt operation is terminated. On the other hand, if DCAP≦DCAPDAT, this means that a first pulse NE1 and a second pulse NE2 have been alternately detected in sequence, so that the first pulse flag FP1 is reset to zero (step S28), the second pulse flag FP2 is reset to zero (Step S29), and the second pulse count value CNTP2 is set equal to #0 (step S30).

FIGS. 5 to 12 respectively illustrate relationships among the first pulse NE1, the second pulse NE2, the first pulse flag FP1, the second pulse flag FP2 and the second pulse count value CNTP2. As mentioned above, it is not possible to identify which of the first and second pulses NE1, NE2 is supplied first to the CPU 5 due to various factors such as errors in mounting the electromagnetic pickups 3a, 3b, a delay in timing in the ECU 4, even when they are be generated at the same angle of the crankshaft. In these figures, the first and second pulses NE1, NE2 indicated by broken lines represent pulses corresponding to the convex lacking portion of the rotary body 1.

Figure 5:
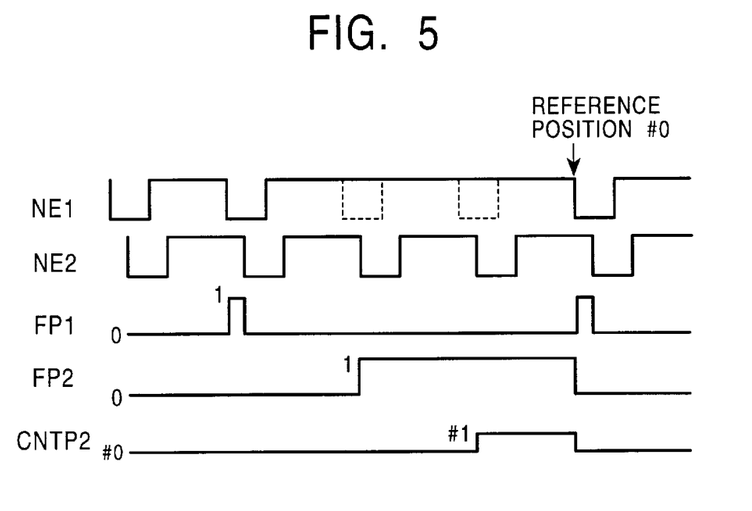
FIGS. 5 to 12 illustrate timing charts representing exemplary operations of the detector shown in FIG. 1 through relationships among NE1, NE2, FP1, FP2 and CNTP2.

FIG. 5 illustrates the case where a first pulse NE1 and a second pulse NE2 are always supplied in this order to the CPU 5 at the same angle of the crankshaft. In the CPU 5, the first pulse flag FP1 is set to one at step S1 in response to the first pulse NE1 input thereto, and a current time is stored in the capture value NE1CAP at step S2. Also, the second pulse flag FP2 is set to one at step S22 in response to the second pulse NE2 input to the CPU 5, and a current time is stored in the capture value NE2CAP at step S24. At step S26, an absolute value DCAP of a difference between the capture values NE1CAP, NE2CAP is calculated. If the first pulse NE1 and the second pulse NE2 are alternately generated in this order, DCAP is determined to be equal to or less than a predetermined value DCAPDAT at step S27, so that FP1=0, FP2=0, CNTP2=#0 are set at steps S25–S30. Thus, FP2=0 is determined at step S4, so that the count value FISTG is incremented by one at step S5.

Referring further to FIG. 5, during a period in which no first pulse NE1 is generated due to the convex lacking portion of the rotary body 1 passing near the electromagnetic pickups 3a, 3b, the second pulse flag FP2 is set to one at step S22 in response to a second pulse NE2 input to the CPU 5 for the first time in the period. Thus, the count value CNTP2 becomes #1 at step S23 in response to the next second pulse NE2 input to the CPU 5. When a first pulse NE1 is supplied to the CPU 5 after the period has passed, the second pulse flag FP2 is reset to zero at step S9, and then DCAP is determined to be larger than the predetermined value DCAPDAT at step S11. Thus, the count value CNTP2 is also reset at step S12, whereby the count value FISTG is set to #0 corresponding to the reference position time of the crankshaft at step S8. Once the reference position time of the crankshaft is known, it is possible to identify stroke of each cylinder in accordance with the subsequent count value FISTG.

Figure 6:
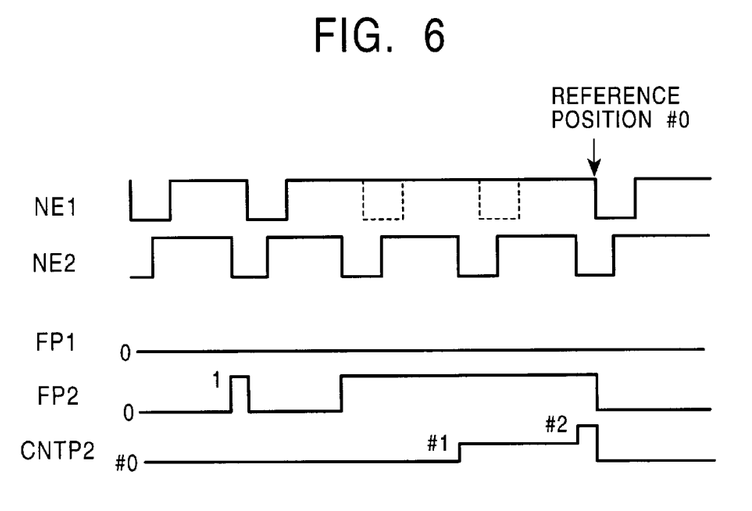

FIG. 6 illustrates the case where a second pulse NE2 and a first pulse NE1 are always supplied in this order to the CPU 5 at the same angle of the crankshaft. In the CPU 5, the second pulse flag FP2 is set to one at step S22 in response to the second pulse NE2 input thereto, and a current time is stored in the capture value NE2CAP at step S24. The first flag FP1 is set to one at step SI in response to the first pulse NE1 input to the CPU 5, a current time is stored in the capture value NE1CAP at step S2, and the second pulse flag FP2 is reset to zero at step S9. Also, an absolute value DCAP of a difference between the capture values NE1CAP, NE2CAP is calculated at step S10. When the second pulse NE2 and the first pulse NE1 are alternately generated in this order, DCAP is determined to be equal to or less than the predetermined value DCAPDAT at step S11, so that the first pulse flag FP1 is reset to zero at step S14, with the result that the first pulse flag FP1 remains zero, as indicated in FP1 in FIG. 6.

During a period in which no first pulse NE1 is generated due to the convex lacking portion of the rotary body 1 in FIG. 6, the second pulse flag FP2 remains one, and in the CPU 5, #1 is added to the second pulse count value CNTP2 at step S23 in response to anther second pulse NE2 input thereto. With the second pulse count value CNTP2 indicating #2, when a first pulse NE1 is generated after the end of the period in which no first pulse NE1 is generated, CNTP2=#2 is determined at step S15 even if DCAP is determined to be equal to or less than DCAPDAT at step S11, so that the count value CNTP2 is reset at step S12, and the count value FISTG is set to #0 corresponding to the reference position time of the crankshaft at step S8.

Figure 7:
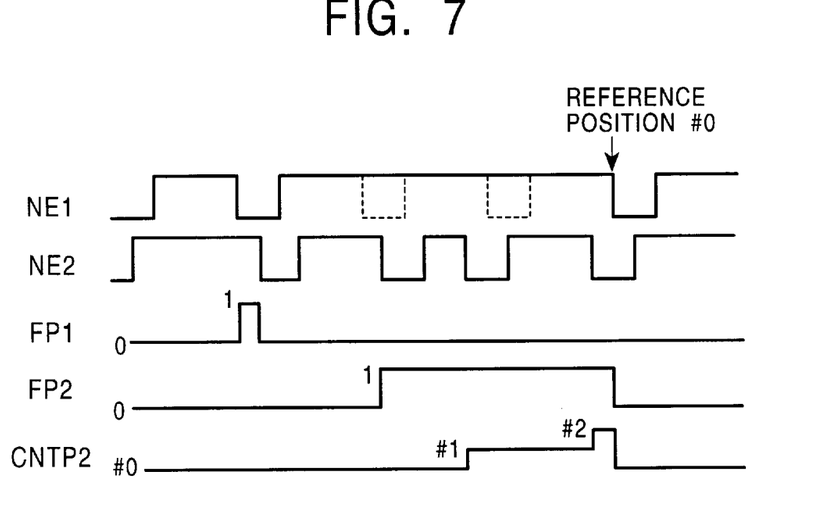

FIG. 7 illustrates an example in which a first pulse NE1 and a second pulse NE2 are generated to the CPU 5 at the same angle of the crankshaft but in an indefinite order. In this example, as is the case of FIG. 6, during a period in which no first pulse NE1 is generated due to the convex lacking portion of the rotary body 1, the second pulse flag FP2 remains one. In the CPU 5, #1 is added to the second pulse count value CNTP2 at step S23 in response to a second pulse NE2 input to the CPU 5. With the second pulse count value CNTP2 indicating #2, when a first pulse NE1 is generated after the end of the period in which no first pulse is generated, CNTP2=#2 is determined at step S15 even if DCAP is determined to be equal to or less than the predetermined value DCAPDAT at step S11, so that the count value CNTP2 is reset at step S12, and the count value FISTG is set to #0 corresponding to the reference position time of the crankshaft at step S8.

Figure 8:
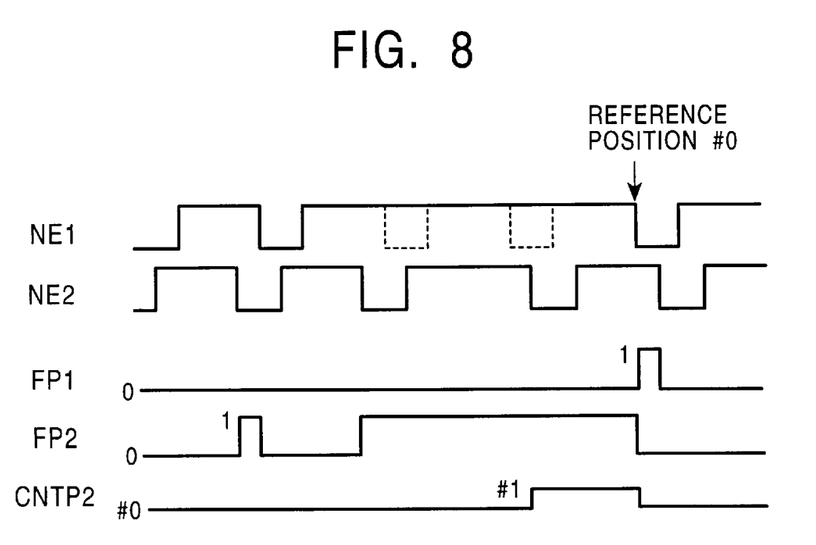

FIG. 8 illustrates another example in which a first pulse NE1 and a second pulse NE2 are supplied to the CPU 5 at the same angle of the crankshaft but in an indefinite order. In this example, as is the case of FIG. 5, during a period in which no first pulse is generated due to the convex lacking portion of the rotary body 1, the second pulse flag FP2 is set to one at step S22 in response to a second pulse NE2 input to the CPU 5 for the first time in the period. Therefore, the second pulse count value CNTP2 becomes #1 at step S23 in response to the next second pulse NE2 input to the CPU 5. When a first pulse NE1 is supplied after the lapse of the period, the second pulse flag FP2 is reset to zero at step S9, and subsequently DCAP is determined to be larger than the predetermined value DCAPDAT ate step S11. Therefore, the count value CNTP2 is also reset at step S12, and the count value FISTG is set to #0 corresponding to the reference position time of the crankshaft at step S8.

Figure 9:
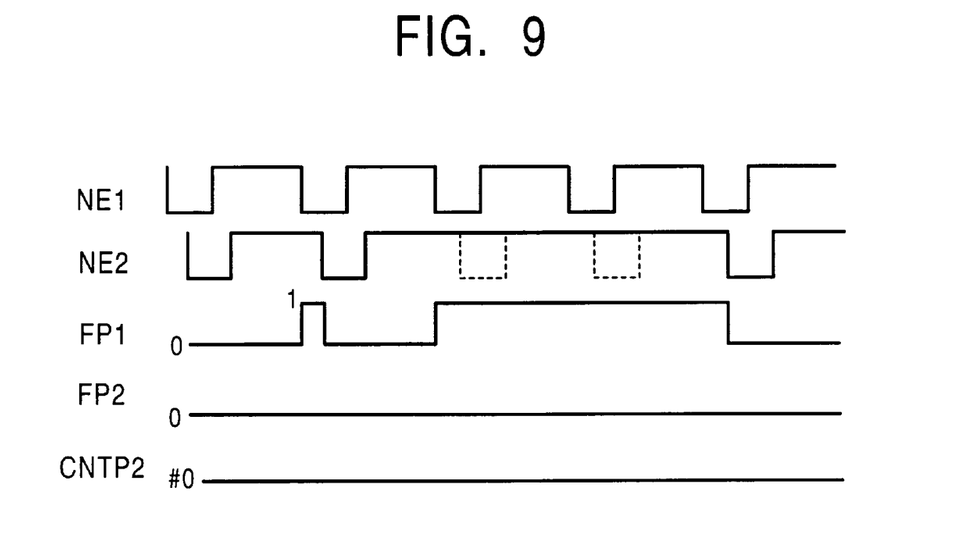
Figure 10:
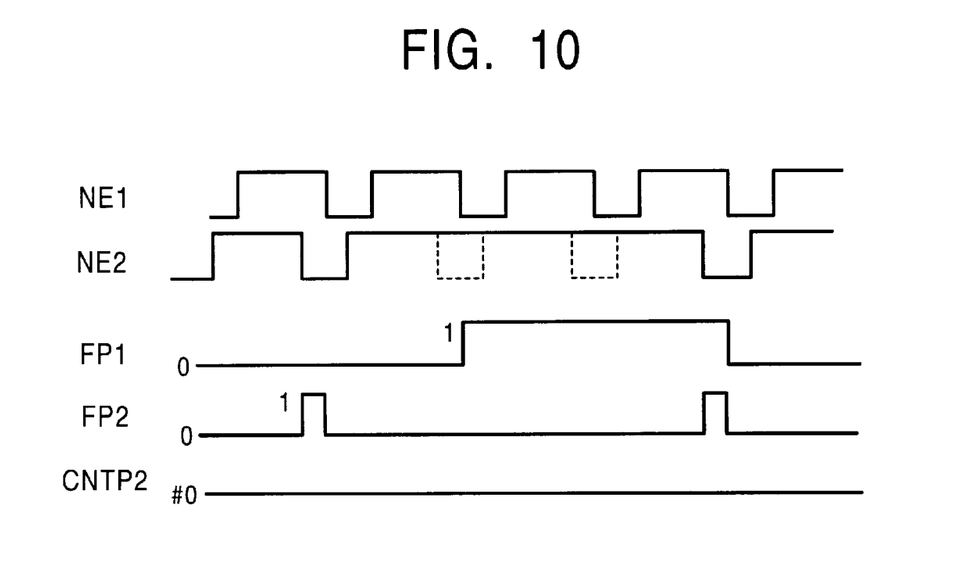
Figure 11:
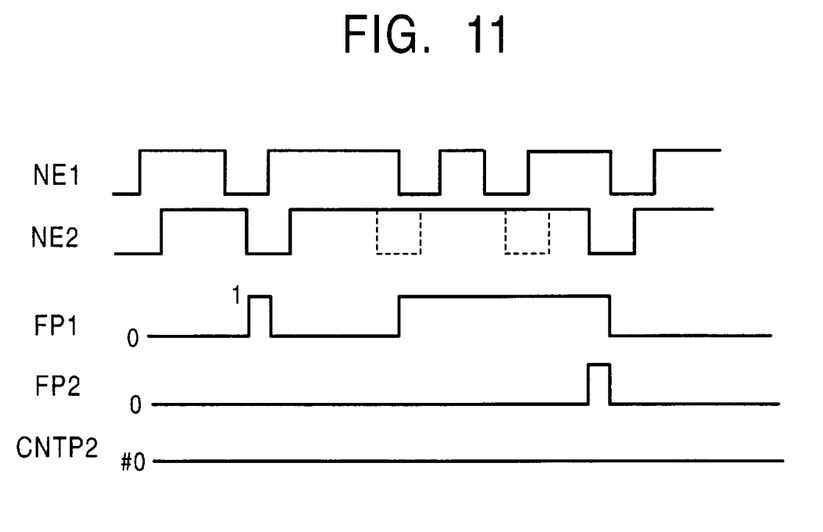
Figure 12:
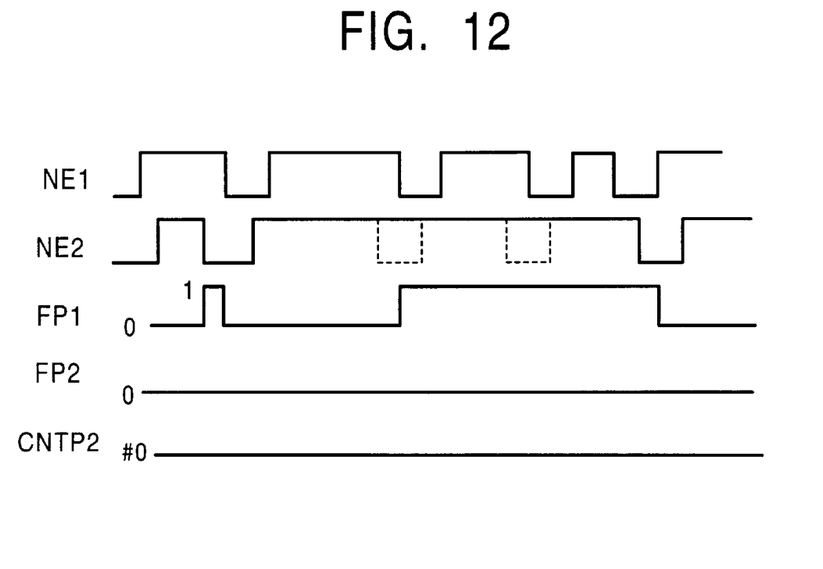

FIG. 9 illustrates an example in which a first pulse NE1 and a second pulse NE2 are always supplied in this order to the CPU 5 at the same angle of the crankshaft. FIG. 10 illustrates the case in which a second pulse NE2 and a first pulse NE1 are always supplied in this order to the CPU 5 at the same angle of the crankshaft. FIG. 11 and FIG. 12 illustrate the cases where a first pulse NE1 and a second pulse NE2 are supplied to the CPU 5 at the same angle of the crankshaft but in an indefinite order. In the examples illustrated in FIGS. 9 to 12, since the second count value CNTP2 does not amount to #2 and the DCAP does not exceed the predetermined value DCAPDAT, the count value FISTG is not set to #0 corresponding to the reference position time of the crankshaft.

Figure 13:
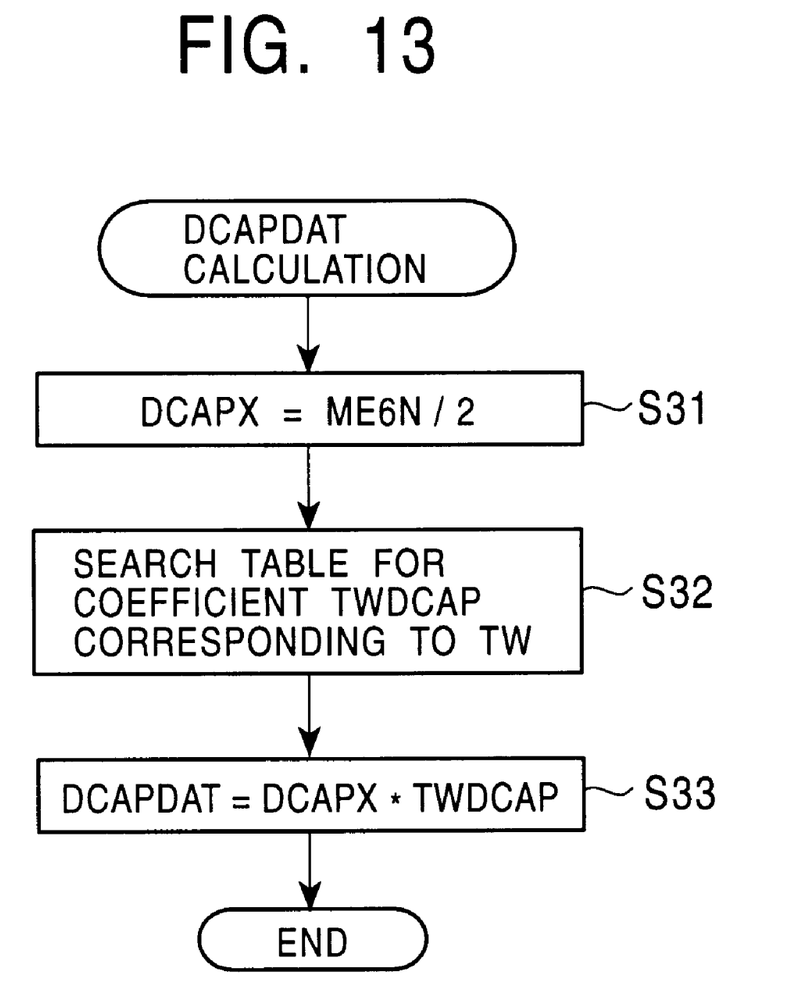
FIG. 13 is a flow chart illustrating an operation for calculating DCAPDAT.

The predetermined value DCAPDAT is set as illustrated in FIG. 13. First, the CPU 5 calculates DCAPX by dividing ME6N by two (step S31), searches a table, not shown, for a coefficient TWDCAP corresponding to a cooling water temperature TW (step S32), and multiplies DCAPX by the coefficient TWDCAP to derive the predetermined value DCAPDAT (step S33). ME6N is a pulse interval of the latest first pulse NE1, and is estimated from a pulse interval of second pulses NE2 for a period in which no first pulse NE1 is generated due to the convex lacking portion of the rotary body 1.

As described above, by setting the reference position time of the crankshaft (FISTG=#0), a conduction control range for an ignition coil and an ignition control range for an ignition plug are established, for example, for a first cylinder with the subsequent count value FISTG, as illustrated in FIG. 2.

While in the foregoing embodiment, the pickups 3a, 3b magnetically detect the convex portions, the convex portions may be optically detected by appropriate pickups. Further, portions to be detected are not limited to the convex portions, but may be magnetic materials embedded in the rotary body. Alternatively, optically detectable marks may be arranged around the outer periphery of the rotary body and detected by photosensors. In addition, portions to be detected may be positioned near the outer periphery of the side surface of the rotary body instead of the outer periphery of the rotary body.

Also, while in the foregoing embodiment, the rotary body lacks two consecutive portions to be detected within a plurality of portions to be detected arranged around the outer periphery thereof, the rotary body may lack only one portion to be detected, or three or more portions to be detected.

Further, while in the foregoing embodiment, the predetermined number CNTP2 of the second pulse NE2 is determined to be #2 (CNTP2=#2), the predetermined number is set in accordance with the number of lacking portions of portions to be detected.

In addition, while the foregoing embodiment has been described in connection with a four-cylinder and four-cycle engine to which the present invention is applied, the present invention may also be applied to any multi-cylinder engine such as a six-cylinder and four-cycle engine.

According to the present invention as described above, first and second pickups are positioned with a fixed angle difference therebetween near the outer periphery of a rotary body, having a plurality of portions to be detected on the outer periphery every predetermined angle, while lacking at least one of the portions to be detected, such that the first and second pickups generate first and second pulses, respectively, each time a portion to be detected passes nearby. If a number of second pulses equal to or more than a predetermined number are detected after the first pulse has been detected, the time the first pulse is newly detected is set as a reference position time for a rotating angle of a crankshaft. After the second pulses have been successively detected without detecting the first pulse, if the magnitude of a difference between the time the first pulse is newly detected and the time the last one of the successively detected second pulses is detected is larger than a predetermined value, the newly detected time of the first pulse is set as a reference position time for the rotating angle of the crankshaft.

It is therefore appreciated that the crank angle detector according to the present invention, when used, can accurately identify the reference position time for the rotating angle of the crankshaft and can therefore determine in which stroke each cylinder exists, thus making it possible to accurately determine engine control timings such as a fuel injection timing, ignition timing and so on for each cylinder.

What is claimed is:

1. A crank angle detector comprising:

a rotary body which rotates in association with a crankshaft of an engine and has portions to be detected every predetermined angle and in which at least one of said portions to be detected is lacking;

first and second pickups positioned near the outer periphery of said rotary body with a fixed angle difference therebetween, for generating first and second pulses for each time the portion to be detected passes nearby;

first pulse detecting means for detecting the first pulse output from said first pickup;

second pulse detecting means for detecting the second pulse output from said second pickup; and reference position setting means for setting a reference position time for a rotating angle of said crankshaft, wherein when a number of second pulses equal to or more than a predetermined number are detected by said second pulse detecting means after the first pulse has been detected by said first pulse detecting means, said reference position setting means sets the time the first pulse is newly detected by said first pulse detecting means, as a reference position time for a rotating angle of said crankshaft.

2. A crank angle detector comprising:

a rotary body which rotates in association with a crankshaft of an engine and has portions to be detected every predetermined angle and in which at least one of said portions to be detected is lacking;

first and second pickups positioned near the outer periphery of said rotary body with a fixed angle difference therebetween, for generating first and second pulses for each time the portion to be detected passes nearby;

first pulse detecting means for detecting the first pulse output from said first pickup;

second pulse detecting means for detecting the second pulse output from said second pickup; and reference position setting means for setting a reference position time for a rotating angle of said crankshaft, wherein after the second pulses are successively detected by said second pulse detecting means without detecting the first pulse by said first pulse detecting means, when the magnitude of a difference between the time the first pulse is newly detected by said first pulse detecting means and the time the last one of the successively detected second pulses is detected by said second pulse detecting means is larger than a predetermined value, said reference position setting means sets the newly detected time of the first pulse, as a reference position time for a rotating angle of said crankshaft.

3. A crank angle detector comprising:

a rotary body which rotates in association with a crankshaft of an engine and has portions to be detected every predetermined angle and in which at least one of said portions to be detected is lacking;

first and second pickups positioned near the outer periphery of said rotary body with a fixed angle difference therebetween, for generating first and second pulses for each time the portion to be detected passes nearby;

first pulse detecting means for detecting the first pulse output from said first pickup;

second pulse detecting means for detecting the second pulse output from said second pickup;

first reference position setting means for setting a reference position time for a rotating angle of said crankshaft, wherein when a number of second pulses equal to or more than a predetermined number are detected by said second pulse detecting means after the first pulse has been detected by said first pulse detecting means, said first reference position setting means sets the time the first pulse is newly detected by said first pulse detecting means, as a reference position time for a rotating angle of said crankshaft; and second reference position setting means for setting a reference position time for a rotating angle of said crankshaft, wherein after the second pulses are successively detected by said second pulse detecting means without detecting the first pulse by said first pulse detecting means, when the magnitude of a difference between the time the first pulse is newly detected by said first pulse detecting means and the time the last one of the successively detected second pulses is detected by said second pulse detecting means is larger than a predetermined value, said second reference position setting means sets the newly detected time of the first pulse, as a reference position time for a rotating angle of said crankshaft.

* * * * *